United States Patent
Ryu et al.

(10) Patent No.: US 9,431,707 B2
(45) Date of Patent: Aug. 30, 2016

(54) APPARATUS AND METHOD FOR WIRELESS POWER TRANSMISSION INCLUDING A SOURCE RESONATOR HAVING A SUBSTANTIALLY UNIFORM MEGNETIC FIELD

(75) Inventors: Young Ho Ryu, Yongin-si (KR); Eun Seok Park, Suwon-si (KR); Jeong Hae Lee, Seoul (KR); Sang Wook Kwon, Seongnam-si (KR); Yun Kwon Park, Dongducheon-si (KR); Young Tack Hong, Seongnam-si (KR); Ki Young Kim, Yongin-si (KR); Nam Yun Kim, Seoul (KR); Dong Zo Kim, Yongin-si (KR); Jin Sung Choi, Gimpo-si (KR); Jae Hyun Park, Pyeongtaek-si (KR); Byung Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 13/359,792

(22) Filed: Jan. 27, 2012

(65) Prior Publication Data
US 2012/0193996 A1 Aug. 2, 2012

(30) Foreign Application Priority Data
Jan. 28, 2011 (KR) .................. 10-2011-0008842

(51) Int. Cl.
*H01F 27/42* (2006.01)
*H01Q 7/00* (2006.01)
(Continued)

(52) U.S. Cl.
CPC .................. *H01Q 7/00* (2013.01); *H01Q 1/38* (2013.01); *H04B 5/0037* (2013.01); *H04B 5/0081* (2013.01); *H01Q 15/0086* (2013.01); *H02J 5/005* (2013.01)

(58) Field of Classification Search
CPC ........................................... H01Q 7/00
USPC ........................................... 307/104
See application file for complete search history.

(56) References Cited

U.S. PATENT DOCUMENTS

| 7,521,890 | B2 | 4/2009 | Lee et al. |
| 8,957,629 | B2 * | 2/2015 | Ryu ............ H02J 7/0045 320/108 |

(Continued)

FOREIGN PATENT DOCUMENTS

| CN | 101867083 A | 10/2010 |
| JP | 2005-525705 A | 8/2005 |

(Continued)

OTHER PUBLICATIONS

Kurs, Andre, et al. "Wireless power transfer via strongly coupled magnetic resonances." Science, vol. 317 No. 5834 (Jun. 7, 2007):pp. 83-86.

(Continued)

*Primary Examiner* — Daniel Cavallari
(74) *Attorney, Agent, or Firm* — NSIP Law

(57) ABSTRACT

A source resonator for wirelessly transmitting power to a target device may include a magnetic field distribution adjusting unit that is configured to adjust the magnetic field generated by the source resonator. In one or more embodiments, the magnetic field distribution adjusting unit may adjust the magnetic field to be substantially uniform in a predetermined vicinity of the source resonator. For example, the magnetic field distribution adjusting unit may adjust the intensity of the magnetic field near the center of the source resonator to be substantially the same as the intensity of the magnetic field near an edge area of the source resonator.

20 Claims, 13 Drawing Sheets

(51) Int. Cl.
*H01Q 1/38* (2006.01)
*H04B 5/00* (2006.01)
*H01Q 15/00* (2006.01)
*H02J 5/00* (2016.01)

(56) References Cited

U.S. PATENT DOCUMENTS

| | | | |
|---|---|---|---|
| 8,994,225 B2* | 3/2015 | Hong | H01Q 7/005 307/104 |
| 2004/0145342 A1 | 7/2004 | Lyon | |
| 2008/0265684 A1 | 10/2008 | Farkas | |
| 2009/0072629 A1 | 3/2009 | Cook et al. | |
| 2009/0096413 A1* | 4/2009 | Partovi | H01F 5/003 320/108 |
| 2009/0284245 A1 | 11/2009 | Kirby et al. | |
| 2010/0164296 A1 | 7/2010 | Kurs et al. | |
| 2010/0187913 A1 | 7/2010 | Smith et al. | |

FOREIGN PATENT DOCUMENTS

| | | |
|---|---|---|
| JP | 2009-261105 A | 11/2009 |
| JP | 2010-073976 A | 4/2010 |
| KR | 10-2010-0070690 A | 6/2010 |
| KR | 10-2010-0083846 A | 7/2010 |
| WO | WO-98/50993 A1 | 11/1998 |
| WO | WO-00/54387 A1 | 9/2000 |
| WO | WO 2008/137996 A1 | 11/2008 |
| WO | WO 2010/080739 | 7/2010 |
| WO | WO 2011/005010 A2 | 1/2011 |
| WO | WO 2011/005012 A2 | 1/2011 |
| WO | WO 2011/143547 A1 | 11/2011 |

OTHER PUBLICATIONS

Kurs, Andre, "Power transfer through strongly coupled resonances." Massachusetts Institute of Technology, (Sep. 2007):pp. 1-42.
Sample, Alanson, et al. "Analysis, Experimental Results, and Range Adaptation of Magnetically Coupled Resonators for Wireless Power Transfer." IEEE Transactions (downloaded Apr. 1, 2010):pp. 1-11.
Korean Office Action issued Oct. 15, 2013 in counterpart Korean Patent Application No. 10-2011-0008842. (4 pages in Korean).
International Search Report mailed Sep. 21, 2012, issued in counterpart International Patent Application No. PCT/KR2012/000626; 3 pages in English language.
Japanese Office Action issued on Oct. 27, 2015 in counterpart Japanese Application No. 2013-551901 (11 pages in Japanese with English translation).
Chinese Office Action issued on Mar. 25, 2015 in counterpart Chinese Application No. 201280006553.7 (31 pages in Chinese with English translation).
Extended European Search Report issued Dec. 16, 2014 in counterpart European Application No. 12739142.3 (7 pages).
European Office Action issued on Mar. 10, 2016 in counterpart European Application No. 12 739 142.3 (6 pages in English).

* cited by examiner

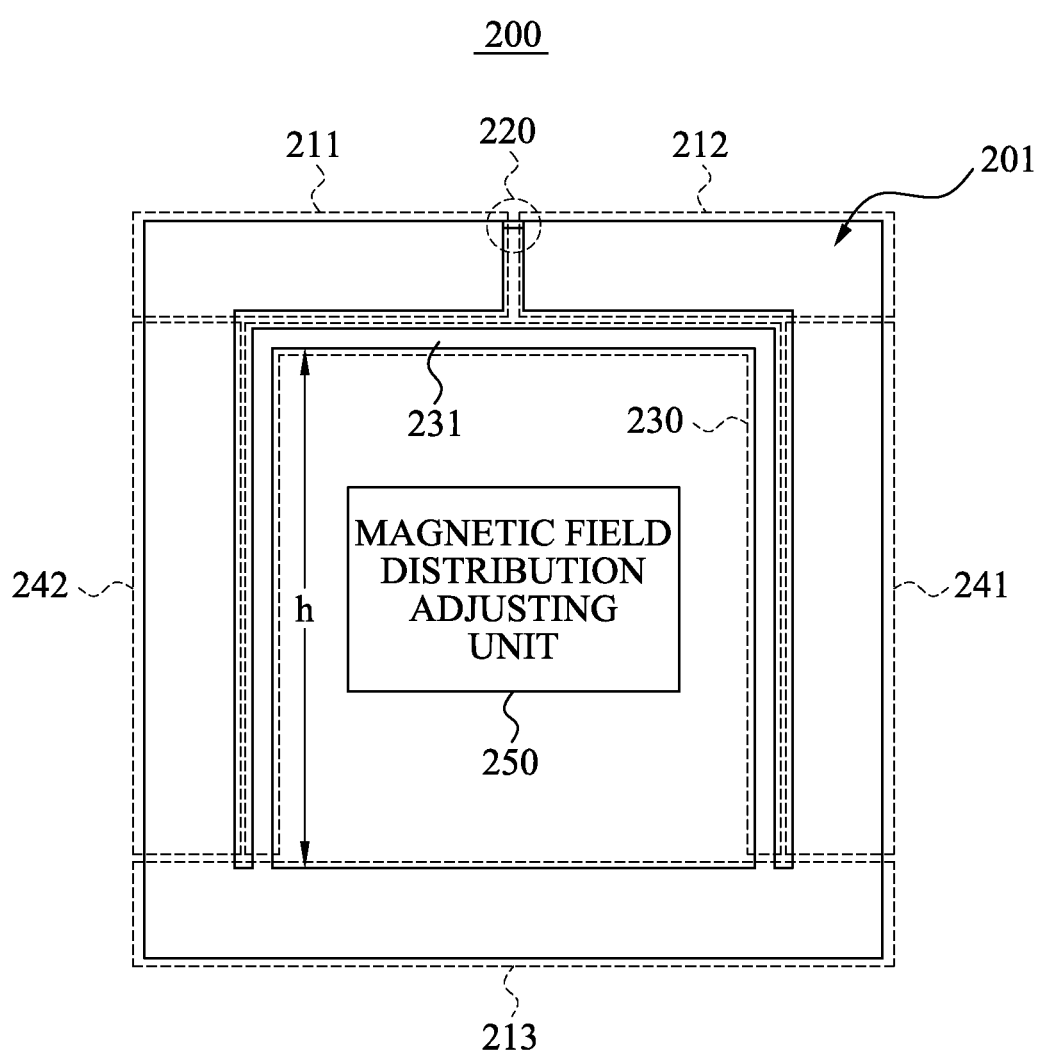

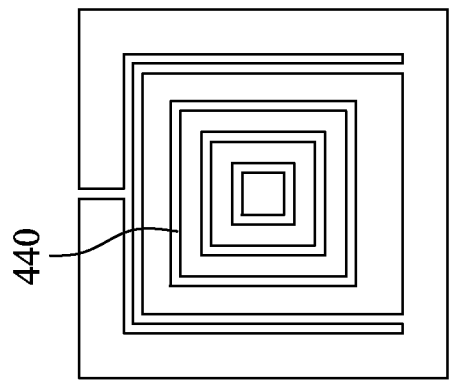
FIG. 4D
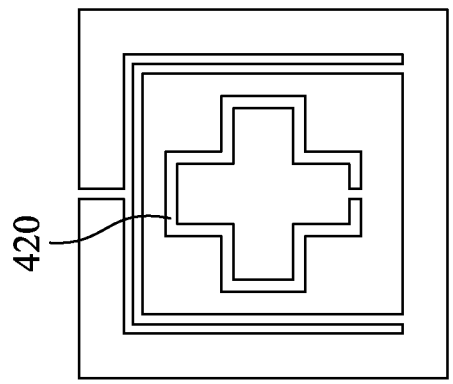
FIG. 4C
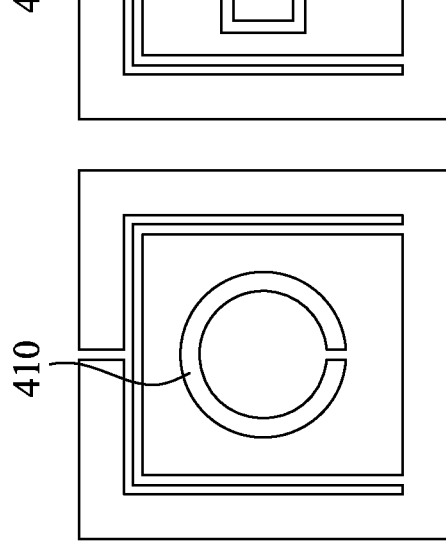
FIG. 4B
FIG. 4A
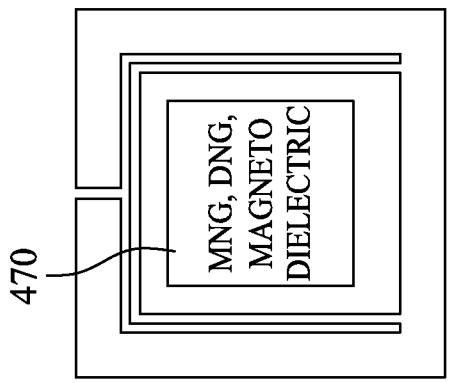
FIG. 4G
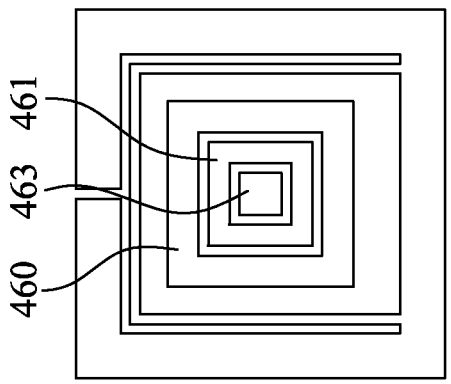
FIG. 4F
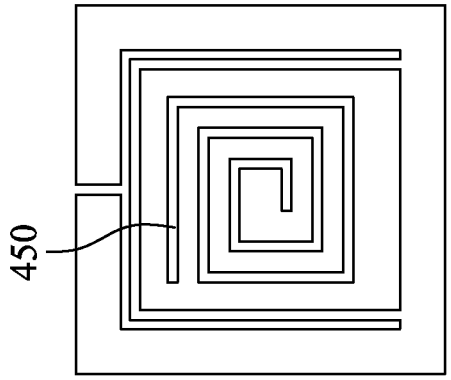
FIG. 4E $$\omega_{MZR} = \frac{1}{\sqrt{L_R C_L}}$$

APPARATUS AND METHOD FOR WIRELESS POWER TRANSMISSION INCLUDING A SOURCE RESONATOR HAVING A SUBSTANTIALLY UNIFORM MEGNETIC FIELD

CROSS-REFERENCE TO RELATED APPLICATION(S)

This application claims the benefit under 35 U.S.C. §119 (a) of Korean Patent Application No. 10-2011-0008842, filed on Jan. 28, 2011, in the Korean Intellectual Property Office, the entire disclosure of which is incorporated herein by reference for all purposes.

BACKGROUND

1. Field

The following description relates wireless power transmission.

2. Description of Related Art

Wireless power refers to energy transferred from a wireless power transmitter to a wireless power receiver, for example, through a magnetic coupling or a resonance coupling. A typical wireless power transmission system may include a source electric device that wirelessly transmits power and a target electric device that wirelessly receives power. The source electric device may include a source resonator, and the target electric device may include a target resonator. The magnetic coupling or the resonance coupling may be formed between the source resonator and the target resonator.

In a wireless environment, however, the distance between the source resonator and the target resonator may vary over time and a matching condition of both resonators may also vary. Thus, the power transmission efficiency may be reduced.

SUMMARY

According to one general aspect, a source resonator for wirelessly transmitting power to a target device may include a magnetic field distribution adjusting unit that is configured to adjust the magnetic field generated by the source resonator. The magnetic field distribution adjusting unit may adjust the magnetic field to be substantially uniform in a predetermined vicinity of the source resonator. The magnetic field distribution adjusting unit may adjust the intensity of the magnetic field near the center of the source resonator to be substantially the same as the intensity of the magnetic field near an edge area of the source resonator.

The source resonator may further include: a first transmission line comprising a first signal conducting portion, a second signal conducting portion, and a first ground conducting portion corresponding to the first signal conducting portion and the second signal conducting portion; a first conductor electrically connecting the first signal conducting portion and the first ground conducting portion; a second conductor electrically connecting the second signal conducting portion and the first ground conducting portion; and a first capacitor inserted between the first signal conducting portion and the second signal conducting portion, in series with respect to a current flowing through the first signal conducting portion and the second signal conducting portion. The first transmission line, the first conductor, and the second conductor are may be a loop structure.

The source resonator may further include: a matcher, positioned inside the loop structure, that is configured to control the impedance of the source resonator.

The source resonator may be configured to wirelessly transmit substantially the same amount of power to a plurality of target devices.

The magnetic field distribution adjusting unit may include at least one sub-resonator. The at least one sub-resonator may include: a second transmission line comprising a third signal conducting portion, a fourth signal conducting portion, and a second ground conducting portion corresponding to the third signal conducting portion and the fourth signal conducting portion; a third conductor electrically connecting the third signal conducting portion and the second ground conducting portion; a fourth conductor electrically connecting the fourth signal conducting portion and the second ground conducting portion; and a second capacitor inserted between the third signal conducting portion and the fourth signal conducting portion, in series with respect to a current flowing through the third signal conducting portion and the fourth signal conducting portion.

The magnetic field distribution adjusting unit may adjust the resonance frequency of the at least one sub-resonator to be different from the resonance frequency of the source resonator. The magnetic field distribution adjusting unit may adjust the resonance frequency of the at least one sub-resonator based on a capacitance of the second capacitor, a length of the second transmission line, a width of the second transmission line, or any combination thereof. The second transmission line, the third conductor, and the fourth conductor may be a loop structure. The at least one sub-resonator may include a plurality of sub-resonators have that are positioned at corresponding corner or edge areas of the source resonator.

The at least one sub-resonator may be spaced apart from the source resonator in a direction normal to the plane of the source resonator by a predetermined distance.

The magnetic field distribution adjusting unit may include: at least one secondary sub-resonator, at least one coil, at least one shield layer, at least metamaterial, or any combination thereof, which is positioned inside the at least one sub-resonator.

The magnetic field distribution adjusting unit may include: at least one coil. The at least one coil may be a loop structure or a spiral-shaped structure. The at least one coil may include a plurality of coils that are concentrically arranged. The at least one coil may be positioned at the center of the source resonator.

The magnetic field distribution adjusting unit may include at least one shield layer. The at least one shield layer may include a plurality of shield layers which are of different size, different height, or both. The at least shield layer may be laminated onto a surface of the source resonator or a surface of the magnetic field distribution adjusting unit. The magnetic field distribution adjusting unit may induces a substantially uniform distribution of the magnetic field generated inside the source resonator by adjusting the length, width, thickness, of any combination thereof of the at least one shield layer. The magnetic field distribution adjusting unit may adjust that at least one shield layer to compensate for a parasitic capacitance generated between the source resonator and a target resonator.

The magnetic field distribution adjusting unit may include at least one layer comprising at least one of mu-negative (MNG) material, a double-negative (DNG) material, or a magneto-dielectric material.

According to another general aspect, a method of wireless power transmitting may include: forming a wireless coupling between a source resonator and a target resonator for wirelessly transmitting power; and adjusting the magnetic field generated by the source resonator to be substantially uniform in a predetermined vicinity of the source resonator.

The adjusting may include adjusting the resonance frequency of the at least one sub-resonator of the source resonator to be different the resonance frequency of the source resonator. The adjusting may include adjusting the capacitance of a capacitor of the at least one sub-resonator to enable the intensity of a magnetic field at a center of the source resonator to be substantially the same as the intensity of a magnetic field at an edge area of the source resonator. The adjusting may include adjusting the distribution of the magnetic field generated inside a secondary sub-resonator of the at least one sub-resonator.

A wireless power transmitter may include the aforementioned source resonator. The source resonator is configured as a pad-type resonator.

Other features and aspects may be apparent from the following detailed description, the drawings, and the claims.

BRIEF DESCRIPTION OF THE DRAWINGS

FIG. 2 is a diagram illustrating a wireless power transmitter including a source resonator.

FIG. 4A to FIG. 4G are diagrams of various embodiments of a magnetic field distribution adjusting unit included in the source resonator.

Figure 1A:
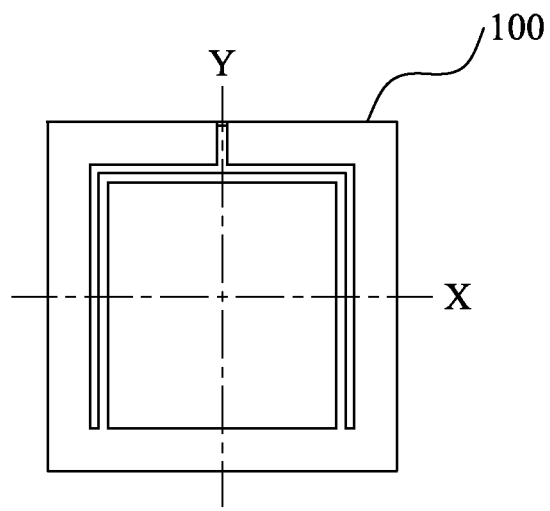
FIGS. 1A-1E show a source resonator and diagrams, photographs and graphs showing magnetic field characteristic thereof.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Experiments have been conducts for determining the uniformity of the magnetic field of a source resonator using a near magnetic field resonance coupling.

FIGS. 1A-E show a source resonator 100 and diagrams, and graphs showing magnetic field characteristic thereof.

FIG. 1A illustrates a top plan view of the source resonator 100 above a plane defined by orthogonal X- and Y-axes. The source resonator 100 is configured as a loop structure having a generally rectilinear or square configuration.

Figure 1B:
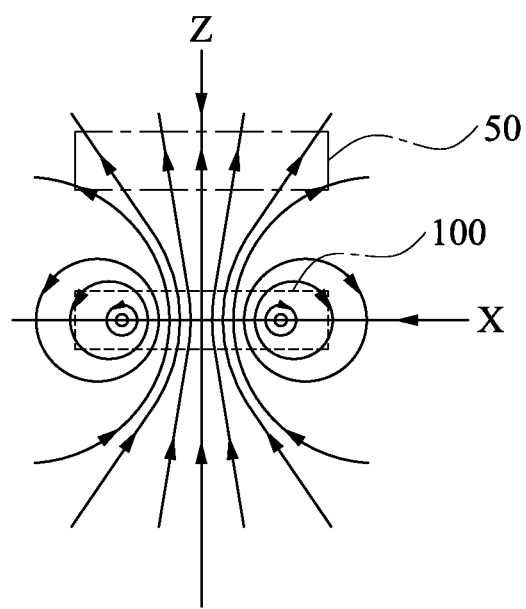

FIG. 1B illustrates the magnetic field created by the source resonator 100 along the Z-axis which is normal to the plane of the source resonator being defined by the X- and Y-axes. The strength of the magnetic field is the weakest near the center of the source resonator. Therefore, when a target resonator 50 is positioned near the source resonator 100, the coupling efficiency tends to be the lowest at the center. On the other hand, the strength of the magnetic field may be strongest at the sides of the source resonator.

Also, it should be appreciated that impedance values may vary location-by-location in the vicinity of the source resonator 100. They are not uniform.

Figure 1C:
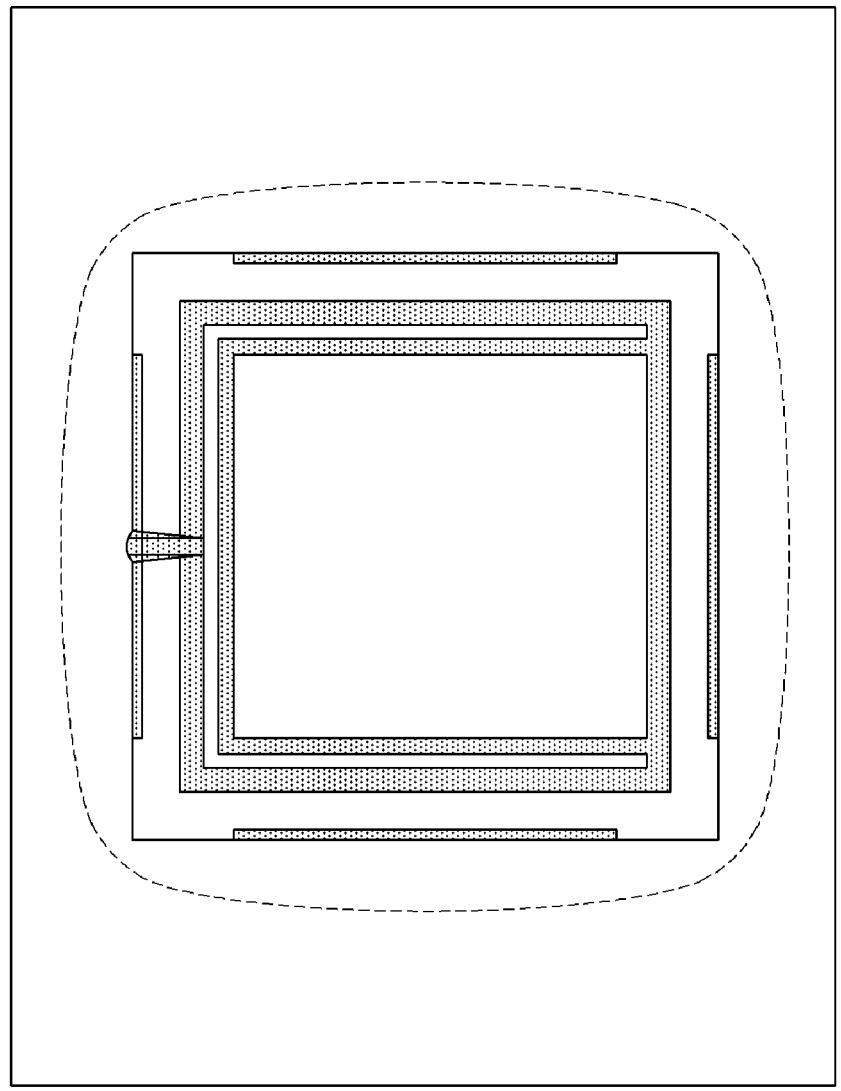

FIG. 1C is a diagram that illustrates the distribution of the magnetic field at a distance 0.3 cm above the source resonator 100. At a distance of about 0.3 cm above the source resonator, the strength of the magnetic field is strongest at an external side thereof and weakest near the center of the source resonator. The strength of the magnetic field of an area of red color may be stronger than the strength of the magnetic field of an area of blue color.

Figure 1D:
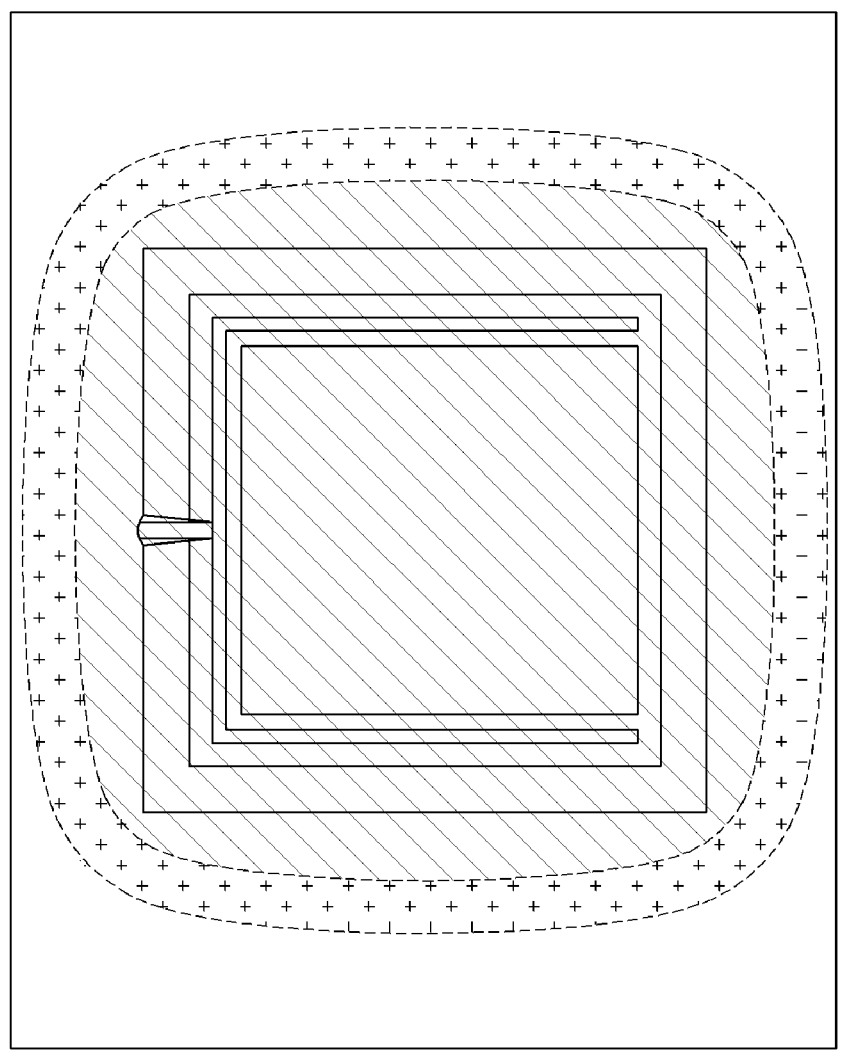

FIG. 1D is a diagram that illustrates the distribution of the magnetic field at a distance 5 cm above the source resonator 100. At a distance of about 5 cm above the source resonator, the distribution of the magnetic field is fairly uniform. The strength of the magnetic field of an area of red color may be stronger than the strength of the magnetic field of an area of pink color or the like.

Figure 1E:
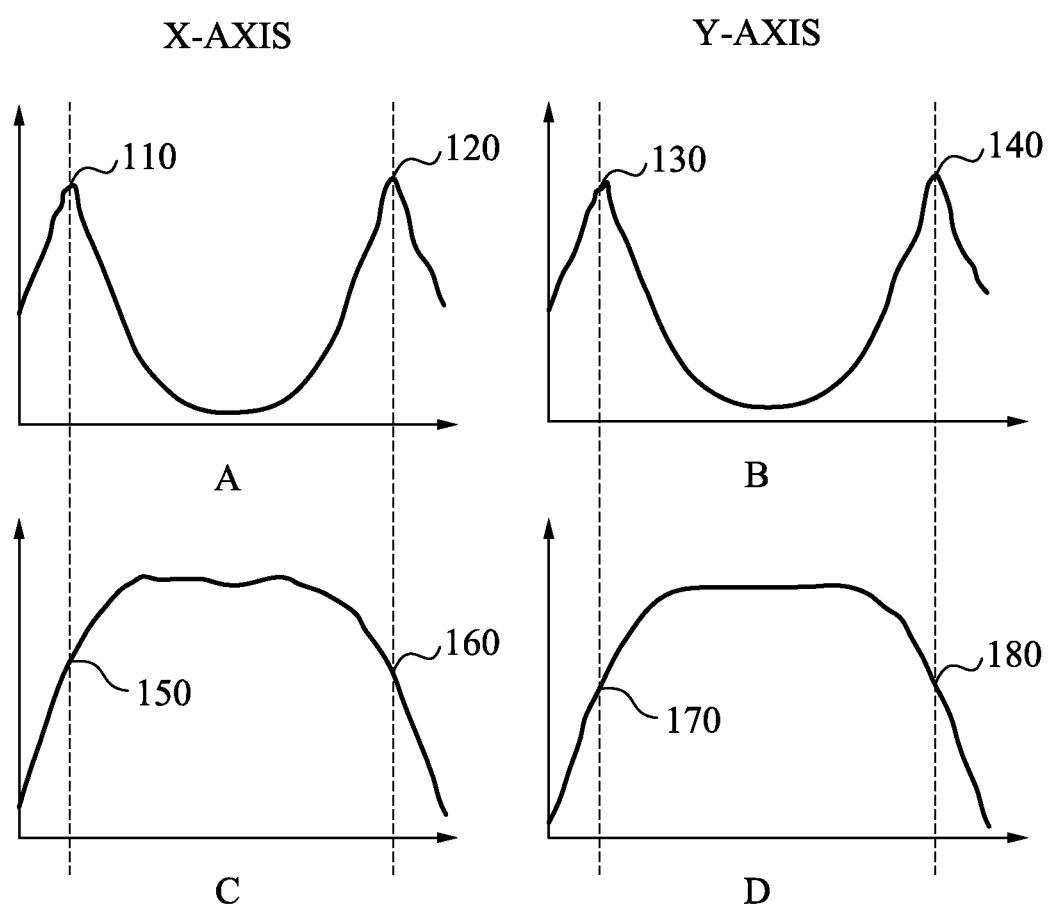

FIG. 1E illustrates various graphs showing the distribution of the magnetic field based on the distance between the source resonator 100 and a target resonator (not shown). Graph A and graph C are associated with the magnetic field that is measured with respect to the source resonator along the x-axis. Graph A shows the magnetic field that is measured at a location that is spaced 1 cm away from the source resonator, whereas graph C shows the magnetic field that is measured at a location that is spaced 5 cm away from the source resonator.

Referring to graph A, points 110 and 120 indicate the intensity measured at an internal/inside edge area of the source resonator. The magnetic field has the highest intensity at points 110 and 120, and the magnetic field has the lowest intensity at a center area of the source resonator. Thus, coupling with the target resonator may have a lowest efficiency at the center of the source resonator. Moreover, the characteristic impedance varies at different locations of the source resonator and thus, a deviation of a resonance frequency may increase.

Referring to graph C, points 150 and 160 indicate the intensity measured at the internal/inside edge area of the source resonator. At a location spaced about 5 cm away from the source resonator, the magnetic field is fairly uniform in the section between points 150 and 160.

Graph B and graph D are associated with the magnetic field that is measured with respect to the source resonator along the y-axis. Graph B shows the magnetic field that is measured at the location that is spaced 1 cm away from the source resonator, where as graph D shows the magnetic field that is measured at the location that is spaced 5 cm away from the source resonator.

Referring to graph B, points 130 and 140 indicate the intensity measured at an internal/inside edge area of the source resonator. The magnetic field has the highest intensity at points 130 and 140, and the magnetic field has the lowest intensity at a center area of the source resonator.

Referring to graph D, points 170 and 180 indicate measured at an internal/inside edge area of the source resonator. At a location that is spaced 5 cm away from the source resonator, the magnetic field is fairly uniform in the section between the points 170 and 180.

When the magnetic field is measured at the location that is spaced 1 cm away from the source resonator, the magnetic field has the highest intensity at the internal edge area of the source resonator and the magnetic field has the lowest intensity at the center of the source resonator, regardless whether the magnetic field is measured along the x-axis or the y-axis.

Accordingly to one or more embodiments, the magnetic field generated by the source resonator may be adjusted using a magnetic field distribution adjusting unit. In one or more embodiments, the magnetic field may be adjusted to be substantially uniform in a predetermined vicinity of the source resonator. For example, the magnetic field distribution adjusting unit may adjust the intensity of the magnetic field near the center of the source resonator to be substantially the same as the intensity of the magnetic field near an edge area of the source resonator, which may be initially higher than at the center of the resonator. This may be accomplished by increasing the intensity of the magnetic field at the center of the source resonator, for instance. Thus, the wireless power transmission efficiency may be improved and impedance may be more constant regardless of location near the source resonator. The magnetic field distribution adjusting unit may be an active or passive element, in one or more embodiments.

A "substantially uniform" magnetic field may vary only ±0.5 A/m(Ampere/meter) in the vicinity of the source resonator, for instance. And the "vicinity" may be the volumetric region that extends about ±2.5 cm from any edge of the source resonator, for instance. The "vicinity" may be determined based on a size of the target resonator. In one example, when the target is positioned between the source resonator and the magnetic field distribution adjusting unit, the distance between the source resonator and the magnetic field distribution adjusting unit may be determined as the vicinity.

The "substantially uniform" magnetic field may be determined based on a variation of mutual flux. When the variation of mutual flux is minimum value, magnetic field can be substantially uniform. The variation of mutual flux can be calculated by the equation 1.

$$\Phi_{var} = \frac{\Phi_{max} - \Phi_{min}}{\Phi_{ave}} \quad \text{[Equation 1]}$$

However, it will be appreciated that the uniformity of the magnetic field and/or the vicinity of the magnetic field may vary according to a particular wireless power transmission application or other desired results.

FIG. 2 illustrates one structure of a wireless power transmitter 200. As shown, the wireless power transmitter 200 includes a source resonator 201 and a magnetic field distribution adjusting unit 250.

The source resonator 201 is configured to form a wireless coupling, such as a magnetic or resonance coupling, with a target resonator so as to wirelessly transmit power to a target device. As shown, the source resonator 201 may include a first transmission line, a first conductor 242, a second conductor 241, at least one first capacitor 220, and a matcher 230.

The first capacitor 220 may be inserted or otherwise positioned, in series, between a first signal conducting portion 211 and a second signal conducting 212 in the first transmission line such that an electric field may be confined within the first capacitor 220. Generally, a transmission line may include at least one conductor in an upper portion of the transmission line, and may include at least one conductor in a lower portion of the transmission line. Current may flow through the at least one conductor disposed in the upper portion of the transmission line, and the at least one conductor disposed in the lower portion may be electrically grounded.

The source resonator 201 has a generally two-dimensional (2-D) structure. In some illustrative examples, the source resonator may also be configured to have a generally three-dimensional (3-D) structure. The first transmission line may include the first signal conducting portion 211 and the second signal conducting portion 212 in the upper portion of the first transmission line, and may include the first ground conducting portion 213 in the lower portion of the first transmission line. The first signal conducting portion 211 and the second signal conducting portion 212 may be disposed to face the first ground conducting portion 213. Current may flow through the first signal conducting portion 211 and the second signal conducting portion 212.

One end of the first signal conducting portion 211 may be electrically connected (i.e., shorted) to the first conductor 242, and the other end is connected to the first capacitor 220. One end of the second signal conducting portion 212 is shorted to the second conductor 241, and the other end is connected to the first capacitor 220. Accordingly, the first signal conducting portion 211, the second signal conducting portion 212, the first ground conducting portion 213, and conductors 241 and 242 may be connected to each other such that the source resonator 200 may have an electrically closed-loop structure. The term "closed-loop structure" as used herein, may include a polygonal structure, for example, a circular structure, a rectangular structure, or the like that is a circuit that is electrically closed.

The first capacitor 220 may be inserted into an intermediate portion of the first transmission line. For example, the first capacitor 220 may be inserted or otherwise positioned into the space between the first signal conducting portion 211 and the second signal conducting portion 212. And the first capacitor 220 may be configured as a lumped element, a distributed element, or the like. A distributed capacitor may include zigzag type conductor lines and a dielectric material having a high permittivity between the zigzag type conductor lines.

When the first capacitor 220 is inserted into the first transmission line, the source resonator 201 may have a property of metamaterial. An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a predetermined magnetic field in a corresponding material and a magnetic flux density occurring with respect to the predetermined magnetic field in a vacuum state. The magnetic permeability and the permittivity, in some embodiments, may be used to determine a propagation constant of a corresponding material in a predetermined frequency or a predetermined wavelength. An electromagnetic characteristic of the corresponding material may be determined based on the magnetic permeability and the permittivity. The metamaterial may be easily disposed in a resonance state without significant material size changes. This may be practical for a relatively large wavelength area or a relatively low frequency area.

When the capacitance of the first capacitor 220 inserted is appropriately determined or configured, the source resonator 201 may have the characteristic of the metamaterial. If the source resonator 201 has a negative magnetic permeability, the source resonator 201 may also be referred to as an MNG resonator. Various criteria may be applied to determine the capacitance of the first capacitor 220 including one or more of the following: a criterion for enabling the source resonator 201 to have the characteristic of the metamaterial, a criterion for enabling the source resonator 201 to have a negative magnetic permeability in a target frequency, a criterion for enabling the source resonator 201 to have a zeroth order resonance characteristic in the target frequency, and/or the like. Based on at least one criterion among the aforementioned criteria, the capacitance of the first capacitor 220 may be determined The source resonator 201, may also be referred to as the MNG resonator 201, and may have a zeroth order resonance characteristic (e.g., having, as a resonance frequency, a frequency when a propagation constant is "0"). If the MNG resonator 201 has a zeroth order resonance characteristic, the resonance frequency may be independent with respect to a physical size of the MNG resonator 201. Thus, by appropriately designing or configuring the first capacitor 220, the MNG resonator 201 may sufficiently control the resonance frequency without substantially changing the physical size of the MNG resonator 201.

In a near field, for instance, the electric field may be concentrated in the first capacitor 220 inserted into the transmission line. Accordingly, the magnetic field may become dominant in the near field. The MNG resonator 201 may have a relatively high Q-factor using the first capacitor 220 of the lumped element and thus, it is possible to enhance an efficiency of power transmission. The Q-factor indicates a level of an ohmic loss or a ratio of a reactance with respect to a resistance in the wireless power transmission. It will be understood that the efficiency of the wireless power transmission may increase according to an increase in the Q-factor.

The MNG resonator 201 may include the matcher 230 which is configured for impedance-matching the source resonator and a target resonator; thus improving power transmission efficiency. The matcher 230 may appropriately adjust the intensity of the magnetic field of the MNG resonator 201. The impedance of the MNG resonator 201 may be determined by the matcher 230. Current may flow in the MNG resonator 201 via a connector, or may flow out from the MNG resonator 201 via the connector. The connector may be connected to the first ground conducting portion 213 or the matcher 230. Power may be transferred wirelessly through the wireless coupling without using a physical connection between the connector and the first ground conducting portion 213 or the matcher 230.

The matcher 230 is positioned within the loop formed by the loop structure of the source resonator 201. The matcher 230 may be configured to adjust the impedance of the source resonator 201 by changing the physical shape of the matcher 230. For example, the matcher 230 may include the conductor 231 for the impedance-matching in a location separate from the first ground conducting portion 213 by a distance h. The impedance of the source resonator 201 may be changed by adjusting the distance h.

In some embodiments, a controller may be provided that is configured to change the physical shape of the matcher 230 based on a control signal generated by the controller. For example, the distance h between a conductor 231 of the matcher 230 and the first ground conducting portion 213 may be increased or decreases based on the control signal. Accordingly, the physical shape of the matcher 230 may be changed so that the impedance of the source resonator 201 may be adjusted.

As shown in FIG. 2, the matcher 230 may be configured as a passive element such as the conductor 231. Of course, in other embodiments, the matcher 230 may be configured as an active element such as a diode, a transistor, or the like. When the active element is included in the matcher 230, the active element may be driven based on the control signal generated by the controller, and the impedance of the source resonator 201 may be adjusted based on the control signal. For example, if the active element is a diode included in the matcher 230, the impedance of the source resonator 201 may be adjusted depending on whether the diode is in an ON state or in an OFF state.

In some implementations, a magnetic core may be further provided to pass through the MNG resonator 201. The magnetic core may increase the power transmission distance.

The source resonator 201 may be configured to wirelessly transmit substantially the same amount of power to one or more target devices that are symmetrically or asymmetrically positioned in the source resonator.

In some embodiments, one or more target devices may be positioned in a wireless power transmitter that is configured as pad. The target devices may be positioned anywhere on the pad.

Power wirelessly transmitted from the source resonator 201 to the target devices may be affected by the intensity of the magnetic field. The magnetic field distribution adjusting unit 250 may be configured to adjust the distribution of the magnetic field at the center and at the internal edge area of the source resonator 201 to be substantially uniform, for instance. Accordingly, the source resonator 201 may wirelessly transmit substantially the same amount of power to one or more target devices, regardless of where the target devices are positioned on the pad. When the amount of power that is wirelessly transmitted from the source resonator 201 over a predetermined time period remains generally constant, the power transmitted from the source resonator 201 to one or more target devices may be about the same.

The source resonator 201 may perform high efficiency transmission of wireless power to a target device positioned near the source resonator 201, without performing a matching process based on a location of the target device. The distribution of the magnetic field at the center and the internal edge area of the source resonator 201 may be adjusted by the magnetic field distribution adjusting unit 250 to be substantially uniform and thus, the matching process based on the location of the target device may not need to be performed.

The magnetic field distribution adjusting unit 250 may be positioned in a predetermined area inside the source resonator 201, and may be configured to adjust the distribution of the magnetic field generated inside the source resonator 201 when the wireless coupling is formed between the source resonator 201 and the target resonator.

The magnetic field distribution adjusting unit 250 may adjust the distribution of the magnetic field generated inside the source resonator 201 to be substantially uniform. In some implementations, the magnetic field distribution adjusting unit 250 may include at least one sub-resonator. And the magnetic field distribution adjusting unit 250 may adjust the distribution of the magnetic field generated inside the source resonator 201 to be substantially uniform, using the at least one sub-resonator. One sub-resonator structure will be described with reference to FIG. 3, below.

The at least one sub-resonator may form a wireless coupling with the source resonator 201 or the target resonator, and may form a magnetic field inside the at least one sub-resonator. The magnetic field formed inside the at least one sub-resonator and the magnetic field generated inside the source resonator 201 may be combined. Thus, the magnetic field generated inside the source resonator 201 may be adjusted to have a substantially uniform distribution.

The magnetic field distribution adjusting unit 250 may include one or more additional sub-resonators. For example, a secondary sub-resonator may be positioned inside the at least one sub-resonator. When the source resonator 201 performs wireless power transmission, the secondary sub-resonator may assist the at least one sub-resonator positioned inside the source resonator to adjust the distribution of the magnetic field generated inside the source resonator 201 to be substantially uniform. The secondary sub-resonator may correct the distribution of the magnetic field that is adjusted by the sub-resonator, for instance. Thus, the distribution of the magnetic field inside the source resonator 201 may have a more substantially uniform distribution.

The magnetic field distribution adjusting unit 250 may include at least one coil that induces the magnetic field generated inside the source resonator 201 to be concentrated near the center of the source resonator 201, thus making the magnetic field distribution more uniform. The magnetic field distribution adjusting unit 250 may be configured such that current flows through the at least one coil in the same direction as current flowing through the source resonator 201. As such, the magnetic field generated inside the source resonator 201 and a magnetic field generated in the at least one coil may be combined to make the distribution of the magnetic field inside the source resonator 201 more uniform based on the combination.

The magnetic field distribution adjusting unit 250 may induce the distribution of the magnetic field generated inside the source resonator 201 to be substantially uniform, based on a length of the at least one coil, a width of the at least one coil, an interval between a plurality of coils, or any combination thereof.

The at least one coil may be positioned at the center of the source resonator 201. One or more coils may be configured as a loop structure, and the size of a loop structure may be different for each coil. Various coils in different sizes may adjust the distribution of the magnetic field generated inside the source resonator 201. Moreover, the at least one coil having the same shape may be positioned inside the source resonator 201. The at least one coil may be positioned at various locations inside the source resonator 201 and may the magnetic field generated inside the source resonator.

In some embodiments, the at least one coil may be positioned in the center of the source resonator 201, and may form a spiral-shaped structure. The spiral may be circular or rectilinear, for example. The at least one coil may embodied in various forms to adjust the magnetic field generated inside the source resonator 201.

The magnetic field distribution adjusting unit 250 may also include one or more shield layers that are formed in loop structures having different sizes and/or different heights based on the center of the source resonator 201. The magnetic field distribution adjusting unit 250 may induce a substantially uniform distribution of the magnetic field generated inside the source resonator 201, based on the shield layers. The flux of the magnetic field generated in the source resonator 201 may be refracted in the plurality of shield layers and thus, the magnetic field may be more concentrated near the center of the source resonator 201.

The magnetic field distribution adjusting unit 250 may include a layer including at least one of an MNG, a DNG, and a magneto-dielectric. The magnetic field distribution controller 250 may refract the flux of magnetic force of the magnetic field generated in the source resonator 201, based on the layer and thus, may induce a substantially uniform distribution of the magnetic field generated inside the source resonator 201.

The magnetic field distribution adjusting unit 250 may adjust the width of at least one shield layer that is laminated onto a predetermined location of the source resonator 201 and/or the at least one sub-resonator, and may induce a substantially uniform distribution of the magnetic field generated inside the source resonator 201. The degree of refraction of the flux of magnetic force of the magnetic field generated in the source resonator 201 may vary based on the length, width, and/or thickness of the shield layer. Therefore, the magnetic field distribution adjusting unit 250 may adjust the length, width and/or thickness of the shield layer to enable the magnetic field generated inside the source resonator 201 to have a substantially uniform distribution.

In one or more embodiments, the source resonator 201 may be configured as a pad-type resonator, which one or more target device may be placed upon a pad to receive power wirelessly. For example, a space between the source resonator 201 and the target resonator of a target device may be less than a few centimeters (i.e., less than 2 cm apart). Unfortunately, a parasitic capacitance might be generated between the source resonator 201 and the target device, and the resonance frequency of the source resonator 201 may be affected by this parasitic capacitance. Thus, in order or more embodiments, the magnetic field distribution adjusting unit 250 may adjust the length, the width, and/or the thickness of one or more of the shield layers to offset any change in the resonance frequency caused by the parasitic capacitance existing between the source resonator 201 and the target resonator.

Figure 3:
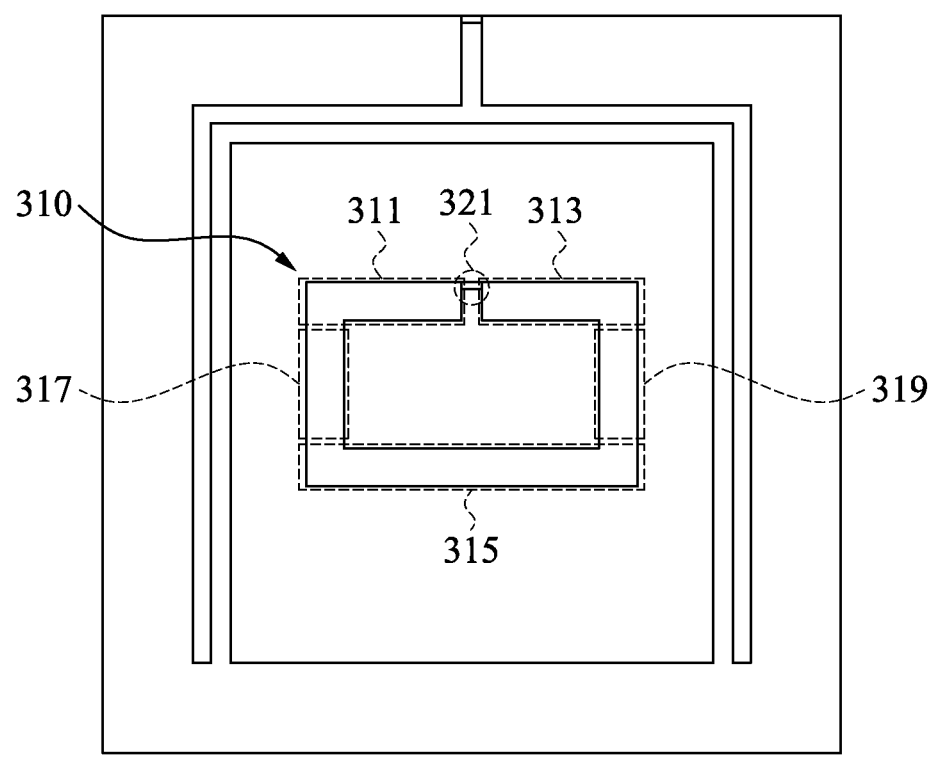
FIG. 3 is a diagram illustrating a sub-resonator positioned within the source resonator.

FIG. 3 illustrates a sub-resonator 310 positioned within the source resonator. As shown, the sub-resonator 310 includes a second transmission line, a third conductor 317, a fourth conductor 319, and at least one second capacitor 321.

The at least one second capacitor 321 may be inserted in series between a third signal conducting portion 311 and a fourth signal conducting portion 313 in a second transmission line such that an electric field is generally confined within the at least one second capacitor 321.

Referring to FIG. 3, the sub-resonator 310 has a generally 2-D structure. Although, it should be appreciated that the sub-resonator may also configured to have a generally three-dimensional (3-D) structure, in other embodiments. The second transmission line may include the third signal conducting portion 311 and the fourth signal conducting portion 313 in an upper portion of the second transmission line, and may include the second ground conducting portion 315 in a lower portion of the transmission line. The third signal conducting portion 311 and the fourth signal conducting portion 313 may be positioned to face the second ground conducting portion 315. Current may flow through the third signal conducting portion 311 and the fourth signal conducting portion 313.

One end of the third signal conducting portion 311 may be electrically connected (i.e., shorted) to the third conductor 317, and the other end is connected to the second capacitor 321. And one end of the fourth signal conducting portion 313 may be shorted to the fourth conductor 319, and the other end is connected to the at least one capacitor 321. Accordingly, the third signal conducting portion 311, the fourth signal conducting portion 313, the second ground conducting portion 315, and conductors 317 and 319 may be connected to each other such that the sub-resonator 310 may have an electrically closed-loop structure.

The second transmission line, the third conductor 317, and the fourth conductor 319 may form a loop structure, such as, for example, a rectilinear loop structure, a circular loop structure, a cross-shaped loop structure, or the like.

In some instances, a controller may be provided that is configured to adaptively determine and adjust a capacitance of the at least one second capacitor 321 to enable the distribution of a magnetic field generated in a source resonator to be substantially uniform. When the capacitance of the at least one second capacitor 321 changes, so will the resonance frequency of the at least one sub-resonator 310. Accordingly, the magnetic field distribution adjusting unit 250 may adjust the capacitance of the at least one second capacitor 321 to adjust the resonance frequency of the at least one sub-resonator 310 to be different the resonance frequency of the source resonator. For example, the magnetic field distribution adjusting unit 250 may be configured to adjust the resonance frequency of the at least one sub-resonator 310 to be different from the resonance frequency of the source resonator, thereby adjusting the intensity of the magnetic field at a center of the source resonator to be similar to the intensity of the magnetic field at an internal edge area of the source resonator.

When the resonance frequency of the at least one sub-resonator 310 is about the same as to the resonance frequency of the source resonator, the magnetic field may be more concentrated on the center of the source resonator. Accordingly, the magnetic field distribution adjusting unit 250 may ensure that the resonance frequency of the at least one sub-resonator 310 has a predetermined difference from the resonance frequency of the source resonator, thereby adjusting a distribution of the magnetic field at the internal edge area and a distribution of the magnetic field at the center of the source resonator to be substantially uniform.

FIGS. 4A-4G illustrate various embodiments of the magnetic field distribution adjusting unit 250 included in the source resonator 201 that are configured to provide a substantially uniform distribution of the strength of the magnetic field at near the source resonator, irrespective of a location of the target resonator.

The magnetic field distribution adjusting unit 250 may be configured to adjust a magnetic field in the vicinity of the source resonator to have a substantially uniform distribution, using a resonator that has various shapes.

Referring to FIG. 4A, the magnetic field distribution adjusting unit may be a circular-shaped sub-resonator 410 that is positioned at the center of the source resonator.

A similar effect may be provided by a having a cross-shaped sub-resonator 420 as shown in FIG. 4B. Other shaped sub-resonators might also be used.

Also, the magnetic field created in the source resonator may be induced by the magnetic field distribution adjusting unit having one or more additional or secondary sub-resonators.

In FIG. 4C, a secondary sub-resonator 430 is positioned at the center of the sub-source resonator.

If the resonance frequency of the secondary sub-resonator is about the same as the resonance frequency of the source resonator, the magnetic field will generally be concentrated at the center and thus, the resonance frequency of the secondary sub-resonator may be adjusted to be higher or lower than the resonance frequency of the source resonator to control the field at the center and the external side to be substantially uniform.

FIGS. 4D-4F shows the magnetic field distribution adjusting unit having a periodic (or repeating) structure. The periodic structure is configured to induce a magnetic field at the center, to prevent focusing of the magnetic field at an external side, and/or to control a magnetic field to be strong at the center. As a result, the magnetic field may be substantially uniformly distributed both at the external side, within and at the center of the source resonator. This is because the strength of the magnetic field may be the strongest at an edge or the external side of the source resonator.

As shown in FIG. 4(d), the magnetic field distribution adjusting unit has a plurality of coils 440 having the same shape but of different sizes, which are concentrically arranged. The coil 440 may be rectilinear (e.g., square) as shown. Although, it will be appreciated that the coils 440 might have other shapes, e.g. circles.

In FIG. 4(e), the magnetic field distribution adjusting unit has a spiral-shaped coil 450. The spiral-shaped coil 450 may be rectilinear (e.g., square) as shown. Although, it will be appreciated that the coil 450 might have other shapes, e.g. circles.

To create uniformity in the magnetic field, the length of the coil, the width of the coil, and/or the spacing between the coils may need to be appropriately adjusted.

In some embodiments, the distribution in the magnetic field may be controlled to be substantially uniform by inducing, at the center, a magnetic field created in the source resource using a magnetic shield having one or more layers. In FIG. 4(f), the magnetic field distribution adjusting unit includes a magnetic shield that is formed of a plurality of layers 460, 461, and 463 of a magnetic material. To create a uniformity of the magnetic field, shield layers may be formed based on the permeability, the loss, the thickness, the sequence of arrangement, the arrangement location, and/or the like.

In some embodiments, the magnetic field distribution adjusting unit may be formed of a metamaterial, such as, for example, mu-negative (MNG) materials, double negative (DNG) material, and magneto-dielectric materials, and/or the like, as discussed above. FIG. 4(g) shows the magnetic field inside the source resonator configured to have to have a substantially uniform distribution, using a structure including metamaterial.

Figure 5:
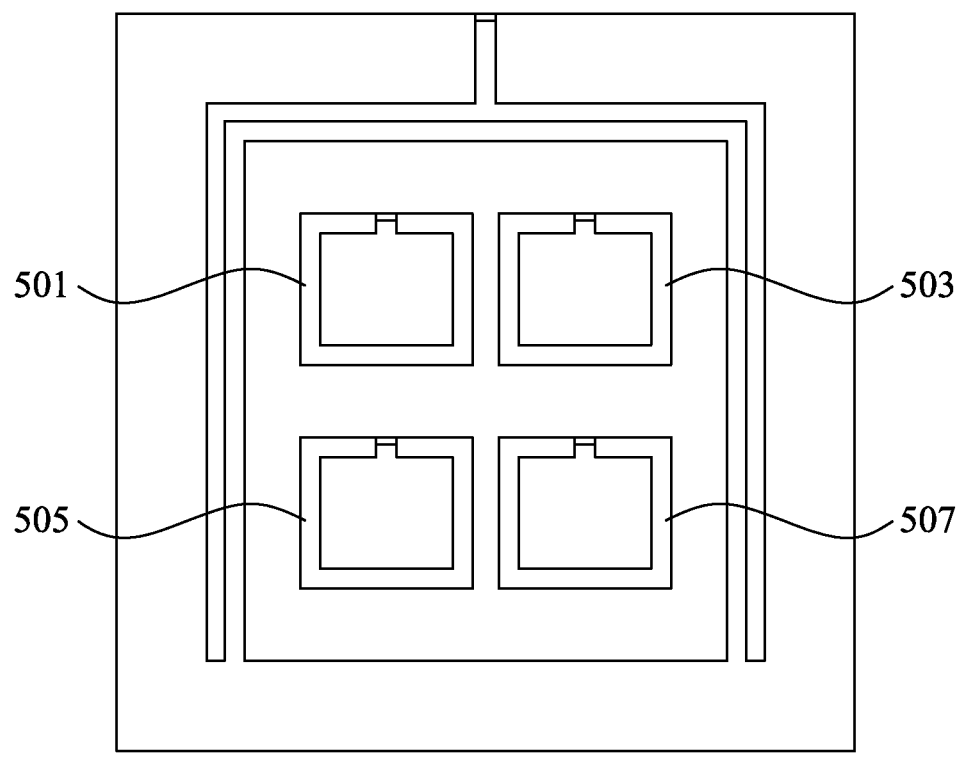
FIG. 5 is a diagram illustrating a periodic structure in which multiple sub-resonators are positioned within the source resonator.

FIG. 5 illustrates a periodic structure in which a plurality of sub-resonators is positioned within the source resonator. As shown, four sub-resonators 501, 503, 505, and 507 are positioned at respective internal corner areas of the source resonator. Thus, the intensity of a magnetic field is highest at the respective internal corner areas of the source resonator. In addition, the sub-resonators 501, 503, 505, and 507 may induce the distribution of the magnetic field concentrated on the respective corner and/or edge areas to be concentrated on a center of the source resonator. The structure of sub-resonators may have the same general shape and/or size. Of course, in other embodiments, the number, the shape and the size of the sub-resonators might be different.

In other embodiments, at least one coil, at least one shield, and/or at least one structure that use metamaterial may be provided, in addition to a sub-resonator, at various areas inside or near the source resonator to induce the magnetic field to be concentrated on the center of the source resonator.

Figure 6A:
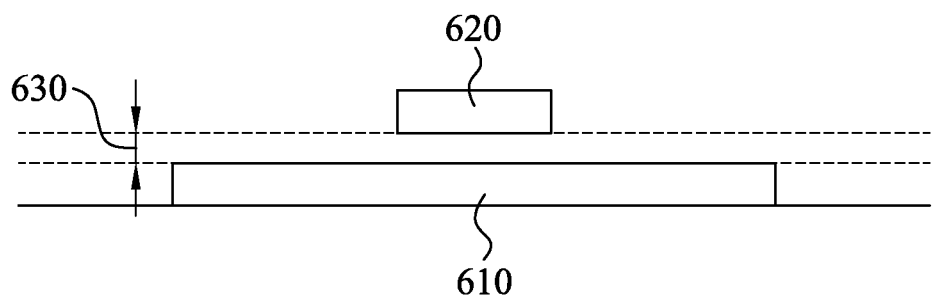
FIGS. 6A and 6B are diagrams illustrating the positional relationships between a sub-resonator and a source resonator.
Figure 6B:
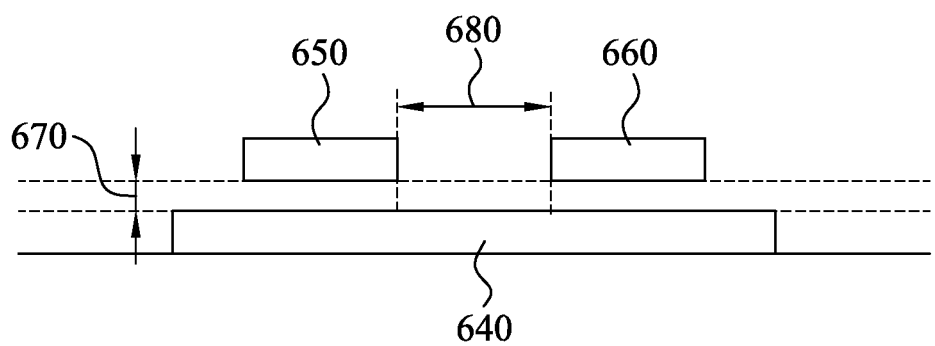

FIGS. 6A and 6B illustrate the positional relationship between a sub-resonator and a source resonator.

Referring to FIG. 6A, the sub-resonator 620 is positioned away source resonator 610 by the predetermined amount 630 in the direction normal to the plane of the source resonator. The sub-resonator 620 may be positioned in an area in which the distribution of the magnetic field generated in the source resonator 610 is low, such as, near the center of the source resonator 610. The sub-resonator 620 may be positioned at the predetermined amount 630 from the source resonator 610 and thus, may induce the magnetic field to be concentrated on the center of the source resonator 610. Moreover, the magnetic field generated in the sub-resonator 620 may be combined with the magnetic field generated in the source resonator 610 and thus, the magnetic field at the center of the source resonator 610 may have a substantially uniform distribution.

Referring to FIG. 6B, two sub-resonators 650 and 660 are positioned from the source resonator 640 at a predetermined amount 670 in the direction normal to the plane of the source resonator. The two sub-resonators 650 and 660 may be used to obtain a substantially uniform distribution of a magnetic field generated in the source resonator 640, in a similar manner as a periodic structure to obtain a substantially uniform distribution of the magnetic field generated in a source resonator. The source resonator 650 and the source resonator 660 may be spaced apart by a minimum interval 680. In some instances, the minimum interval 680 may be the distance of an offset between the magnetic field generated by current flowing through the sub-resonator 650 and the magnetic field generated by a current flowing through the sub-resonator 660.

While two sub-resonators are shown in FIG. 6B, it will be appreciated that one or more additional sub-resonators may be provided in other embodiments.

Figure 7:
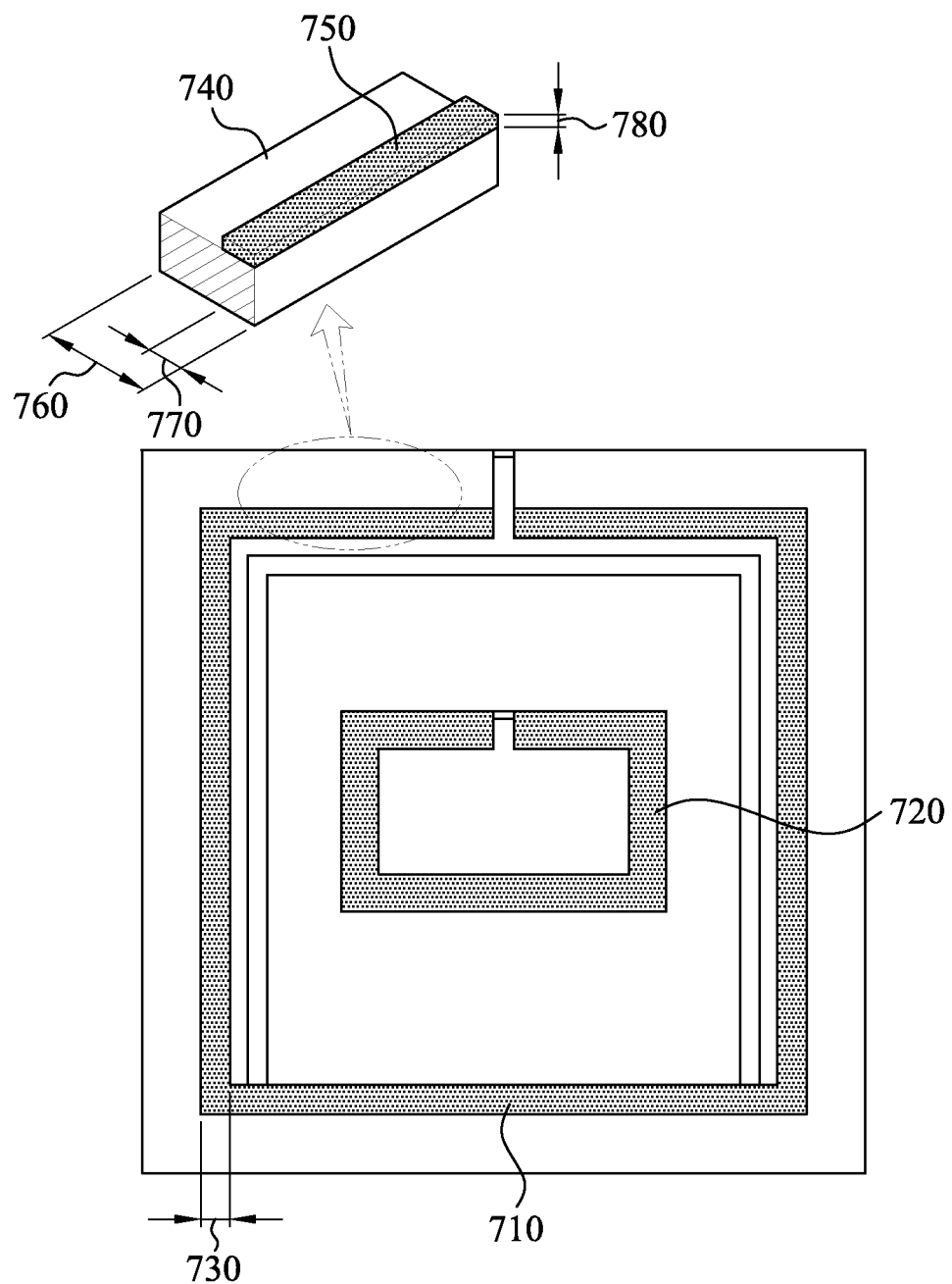
FIG. 7 is a diagram illustrating a shield layer laminated onto a source resonator and a sub-resonator.

FIG. 7 illustrates a shield that is laminated onto a source resonator 740 and a sub-resonator.

The shield 750 is laminated onto a predetermined area 710 of the source resonator 740 and a predetermined area 720 of the sub-resonator. A wireless power transmitter may enable a distribution of a magnetic field generated inside the source resonator 740 to be substantially uniform, using the shield.

The wireless power transmitter may adjust the length, the width, and/or the thickness of the shield layers that are laminated onto the predetermined area 710 of the source resonator 740 and/or the predetermined area 720 of the sub-resonator, and thus may induce a substantially uniform distribution of the magnetic field that is generated inside the source resonator 740.

In addition, the wireless power transmitter may adjust the length, the width 730 and/of the thickness of the shield layer laminated onto the predetermined area 710 of the source resonator 740 and/or the predetermined area 720 of the sub-resonator. This may be effective to offset any change in a resonance frequency caused by a parasitic capacitance existing between the source resonator 740 and a target resonator.

The width 770 of the shield 750 to be laminated may be determined based on a degree of refraction of a flux of the magnetic field generated in the source resonator 740. In the source resonator 740, the shield 750 may be laminated to have the width 770 corresponding to three-fifths of the width 760 of the source resonator 740. For example, when the width 760 of the source resonator 740 is about 2.5 cm, the width 770 of the shield 750 to be laminated may be approximately 1.5 cm.

In some implementations, the width 770 of the shield 750 to be laminated may be about three-fifths of the width 760 of the source resonator 740. And, the thickness 780 of the shield 750 may be greater than or equal to 0.1 millimeters (mm) and less than or equal to 1 mm, when the source resonator 740 is a pad-type resonator, for example.

Figure 8A:
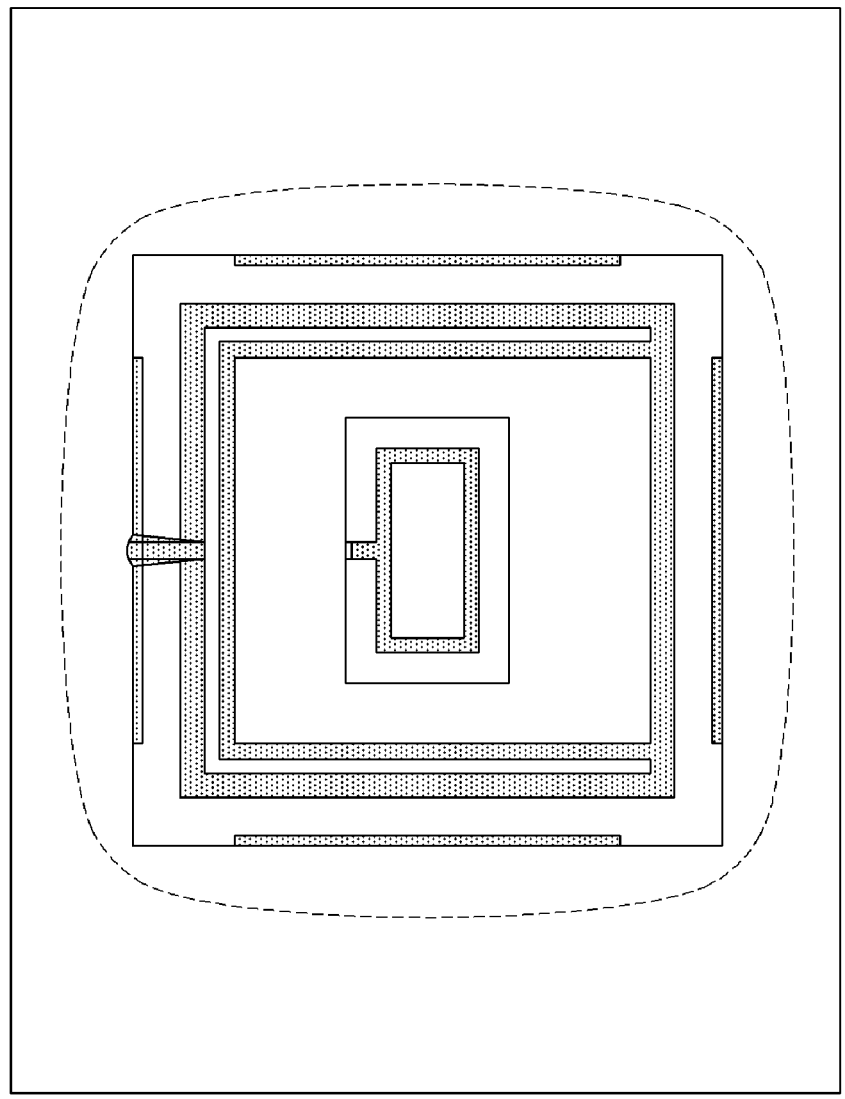
FIGS. 8A and 8B are diagrams showing the distribution of the magnetic field created in a source resonator is substantially uniform.
Figure 8B:
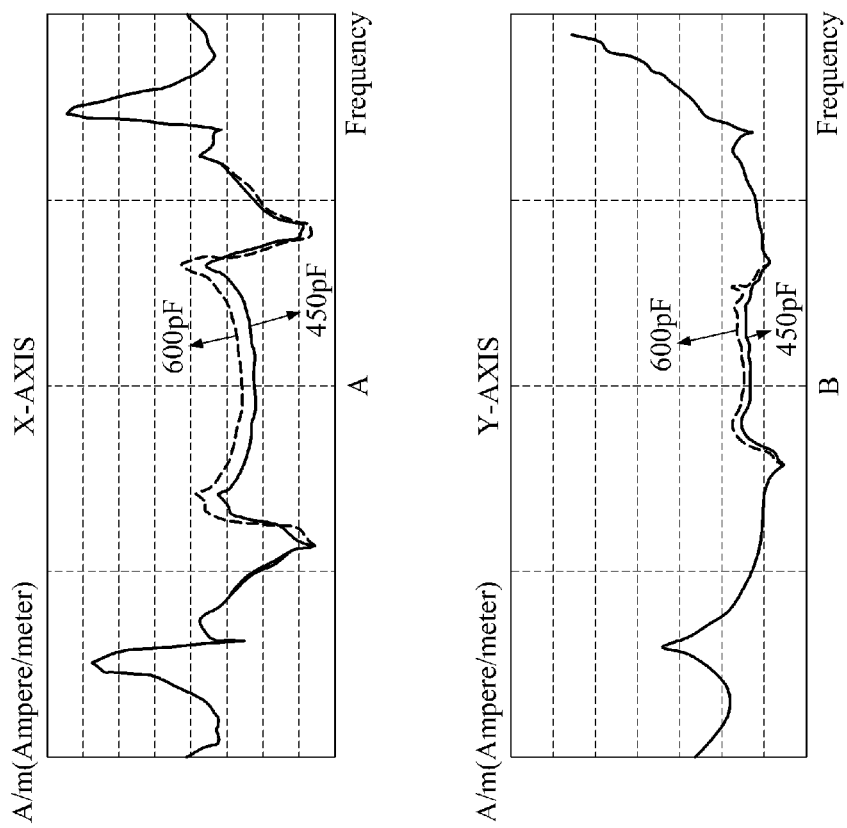

FIG. 8A is a diagram that shows the distribution of the magnetic field created in a source resonator is substantially uniform. As will be appreciated, the strength of the magnetic field is significantly stronger at the center of the source compared to the typical distribution for the magnetic field of the source resonator as illustrated in FIG. 1. Thus, the distribution of the magnetic field is more uniform in the vicinity of the source resonator.

Also, as shown in the graphs A and B of 8B, the strength of the magnetic field becomes stronger at the center and thus, the distribution becomes substantially uniform. Therefore, changes in impedance are minimized regardless of a location on the source resonator; thus, efficiency may be optimized.

Figure 9:
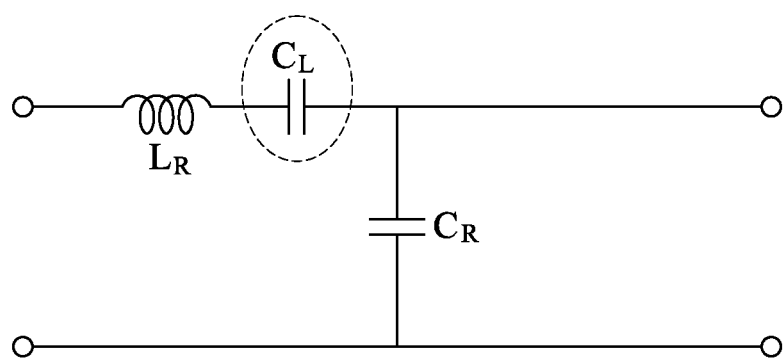
FIG. 9 is a diagram illustrating one equivalent circuit of the source resonator for wireless power transmission illustrated in FIG. 2.

FIG. 9 illustrates one equivalent circuit of the source resonator 201 for the wireless power transmission of FIG. 2.

The source resonator 201 of FIG. 2 for the wireless power transmission may be modeled to the equivalent circuit of FIG. 9. In the equivalent circuit of FIG. 9, $L_R$ denotes an inductance of the power transmission line, $C_L$ denotes the capacitor 220 that is inserted in a form of a lumped element in the middle of the power transmission line, and $C_R$ denotes a capacitance between the power transmissions and/or ground of FIG. 2.

In some instances, the source resonator 201 may have a zeroth resonance characteristic. For example, when a propagation constant is "0", the source resonator 201 may be assumed to have $\omega_{MZR}$ as a resonance frequency. The resonance frequency $\omega_{MZR}$ may be expressed by Equation 2 as follows.

$$\omega_{MZR} = \frac{1}{\sqrt{L_R C_L}} \quad \text{[Equation 2]}$$

In Equation 2, MZR denotes a Mu zero resonator.

Referring to Equation 2, the resonance frequency $\omega_{MZR}$ of the source resonator 201 may be determined by $L_R$ and $C_L$. The physical size of the source resonator 201 and the resonance frequency $\omega_{MZR}$ may be independent with respect to each other, in some instances. Since the physical sizes are independent with respect to each other, the physical size of the source resonator 201 may be sufficiently reduced.

Accordingly, impedance may be maintained irrespective of a location of a target resonator and thus, a change in efficiency may not occur and efficiency is optimally maintained. This may be especially true for pad-type resonators. Moreover, the wireless power transmission system may be embodied as a single matching circuit. Thus, drawbacks in which power is not distributed based on a change in impedance and/or location when multiple targets are used in near wireless power transmission may be readily solved.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
   a source resonator for wirelessly transmitting power to a target device; and
   at least one sub-resonator,
   positioned inside of the source resonator,
   wherein the at least one sub-resonator comprises:
   a first transmission line comprising a first signal conducting portion, a second signal conducting portion, and a first ground conducting portion corresponding to the first signal conducting portion and the second signal conducting portion;
   a first conductor electrically connecting the first signal conducting portion and the first ground conducting portion;
   a second conductor electrically connecting the second signal conducting portion and the first ground conducting portion; and
   a first capacitor inserted between the first signal conducting portion and the second signal conducting portion, in series with respect to a current flowing through the first signal conducting portion and the second signal conducting portion.

2. The wireless power transmitter of claim 1, wherein the source resonator comprises:
   a second transmission line comprising a third signal conducting portion, a fourth signal conducting portion, and a second ground conducting portion corresponding to the third signal conducting portion and the fourth signal conducting portion;
   a third conductor electrically connecting the third signal conducting portion and the second ground conducting portion;
   a fourth conductor electrically connecting the fourth signal conducting portion and the second ground conducting portion; and
   a second capacitor inserted between the third signal conducting portion and the fourth signal conducting portion, in series with respect to a current flowing through the third signal conducting portion and the fourth signal conducting portion.

3. The wireless power transmitter of claim 2, wherein the second transmission line, the third conductor, and the fourth conductor are a loop structure.

4. The wireless power transmitter of claim 3, further comprising:
   a matcher, positioned inside the loop structure, that is configured to control the impedance of the source resonator.

5. The wireless power transmitter of claim 1, wherein a resonance frequency of the at least one sub-resonator different from a resonance frequency of the source resonator.

6. The wireless power transmitter claim 5, wherein the resonance frequency of the at least one sub-resonator is adjusted based on a capacitance of the first capacitor, a length of the first transmission line, a width of the first transmission line, or any combination thereof.

7. The wireless power transmitter of claim 1, wherein the first transmission line, the first conductor, and the second conductor are a loop structure.

8. The wireless power transmitter of claim 1, wherein the at least one sub-resonator comprises a plurality of sub-resonators have that are positioned at corresponding corner or edge areas of the source resonator.

9. The wireless power transmitter of claim 1, wherein the at least one sub-resonator is spaced apart from the source resonator in a direction normal to the plane of the source resonator by a predetermined distance.

10. The wireless power transmitter of claim 1, wherein the wireless power transmitter further comprises: at least one secondary sub-resonator, at least one coil, at least one shield layer, at least metamaterial, or any combination thereof, which is positioned inside the at least one sub-resonator.

11. The source resonator of claim 1, wherein the at least one sub-resonator comprises: at least one coil.

12. The source resonator of claim 11, wherein the at least one coil is a loop structure or a spiral-shaped structure.

13. The source resonator of claim 11, wherein the at least one coil comprise a plurality of coils that are concentrically arranged.

14. The source resonator of claim 11, wherein the at least one coil is positioned at the center of the source resonator.

15. The source resonator of claim 1, wherein the wireless power transmitter further comprises: at least one shield layer.

16. The source resonator of claim 15, wherein the at least one shield layer comprises a plurality of shield layers which are of different size, different height, or both.

17. The source resonator of claim 15, wherein the at least shield layer is laminated onto a surface of the source resonator or a surface of the at least one sub-resonator .

18. The source resonator of claim 15, wherein at least one sub-resonator induces a substantially uniform distribution of the magnetic field generated inside the source resonator by adjusting the length, width, thickness, of any combination thereof of the at least one shield layer.

19. The source resonator of claim 18, wherein at least one sub-resonator adjusts that at least one shield layer to compensate for a parasitic capacitance generated between the source resonator and a target resonator.

20. The source resonator of claim 1, wherein at least one sub-resonator includes a layer comprising at least one of mu-negative (MNG) material, a double-negative (DNG) material, or a magneto-dielectric material.

* * * * *